(12) United States Patent  
Ho et al.

(10) Patent No.: US 9,148,196 B2  
(45) Date of Patent: Sep. 29, 2015

(54) SYNCHRONIZATION DEVICE AND SYNCHRONIZATION METHOD THEREOF

(71) Applicant: Institute For Information Industry, Taipei (TW)

(72) Inventors: Jan-Shin Ho, Magong (TW); Wei-Shing Wang, New Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 14/090,620

(22) Filed: Nov. 26, 2013

(65) Prior Publication Data

US 2015/0139281 A1    May 21, 2015

(30) Foreign Application Priority Data

Nov. 15, 2013   (CN) .......................... 2013 1 0572187

(51) Int. Cl.
*H04B 1/00* (2006.01)
*H04B 1/708* (2011.01)

(52) U.S. Cl.
CPC ...................................... *H04B 1/708* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00

See application file for complete search history.

(56) References Cited

U.S. PATENT DOCUMENTS

2007/0229355 A1* 10/2007 Han et al. ...................... 342/419
2009/0003412 A1*  1/2009 Negoro et al. ................ 375/130
2009/0074031 A1   3/2009 Fukuda

FOREIGN PATENT DOCUMENTS

CN          1275844 A       12/2000

OTHER PUBLICATIONS

Office Action to the corresponding Taiwan Patent Application rendered by Taiwan Intellectual Property Office (TIPO) on May 18, 2015, 7 pages (including English translation).

* cited by examiner

*Primary Examiner* — Adolf Dsouza
(74) *Attorney, Agent, or Firm* — Skaar Ulbrich Macari, P.A.

(57) ABSTRACT

A synchronization device and a synchronization method for use in a receiver are provided. The receiver receives a signal from a transmitter. The synchronization device generates a plurality of first pseudo noise codes in sequence according to a first code phase sequence and generates a plurality of second pseudo noise codes in sequence according to a second code phase sequence which is the reverse of the first code phase sequence, simultaneously. Every time a first pseudo noise code and a second pseudo noise code are generated, the synchronization device makes a correlation calculation for the first pseudo noise code, the second pseudo noise code and the signal. The synchronization device further determines a code phase according to the correlation calculations, and synchronizes with the signal according to the code phase. The synchronization method is applied to the synchronization device to implement the operations.

18 Claims, 5 Drawing Sheets

SYNCHRONIZATION DEVICE AND SYNCHRONIZATION METHOD THEREOF

PRIORITY

This application claims priority to CN Patent Application No. 201310572187.8 filed on Nov. 15, 2013, which is hereby incorporated by reference in its entirety.

FIELD

The present invention relates to a synchronization device and a synchronization method thereof. More particularly, the present invention relates to a synchronization device and a synchronization method thereof for use in a spread spectrum communication system.

BACKGROUND

In recent years, the spread spectrum (SS) technology has been widely used in various wireless communication systems. The main technical feature of SS communication is that the radio frequency (RF) bandwidth used for signal transmission is considerably larger than the bandwidth of data. In practice, a transmitter spreads the data transmitted to a very wide frequency band by use of a pseudo noise code (PN code), while a receiver restores the data transmitted by use of the same PN code. With the aforesaid operations, SS communication exhibits good interference immunity and a good anti-interception ability, and has a very good performance even under extremely poor channel conditions.

In implementation of an SS communication system, synchronization is one of the very important steps, and more importantly, PN code synchronization is the primary step to establish SS communication. The PN code synchronization is achieved by tuning a PN code generator of the receiver in such a way that a difference between the phase of the PN code generator and the phase of the PN code received is less than one chip. Since PN codes have a good autocorrelation property, the PN code phase difference can be determined according to a magnitude of a value output by a correlator. If the PN code phase difference is zero (i.e., the two PN code phases coincide with each other completely), then the signal output by the correlator is the strongest. Otherwise, if the PN code phase difference exceeds one chip, then the correlator outputs a signal that is similar to a noise.

To make the operation of PN code synchronization less complex, the PN code synchronization may be divided into two stages, that is, a PN code acquisition stage and a PN code tracking stage. The PN code acquisition stage is to find the correct code phase through code phase searching so that the PN code phase difference is controlled to be less than one chip (usually set to be 0.5 chips). For the PN code acquisition stage, the efficiency of the code phase searching is a key factor that affects PN code synchronization.

Accordingly, an urgent need exists in the art to provide a solution capable of performing code phase searching efficiently in the PN code acquisition stage.

SUMMARY

A primary objective of the present invention is to solve the aforesaid problem, that is, to provide a more efficient method for code phase searching in the PN code acquisition stage.

To achieve the aforesaid objective, certain embodiments of the present invention provide a synchronization device for use in a receiver. The receiver is configured to receive a signal from a transmitter. The synchronization device comprises a code generating unit, a correlation unit, a determining unit and a synchronization unit. The correlation unit is electrically connected to the code generating unit, the determining unit is electrically connected to the correlation unit, and the synchronization unit is electrically connected to the determining unit. The code generating unit is configured to execute the following operations simultaneously: generating a plurality of first pseudo noise codes in sequence according to a first code phase sequence; and generating a plurality of second pseudo noise codes in sequence according to a second code phase sequence which is the reverse of the first code phase sequence. The correlation unit is configured to, every time one first pseudo noise code and one second pseudo noise code are generated by the code generating unit, execute a correlation calculation for the first pseudo noise code, the second pseudo noise code and the signal. The determining unit is configured to determine a code phase according to the correlation calculations. The synchronization unit is configured to synchronize with the signal according to the code phase.

To achieve the aforesaid objective, certain embodiments of the present invention also provide a synchronization method for use in a receiver. The receiver is configured to receive a signal from a transmitter and comprises a code generating unit, a correlation unit, a determining unit and a synchronization unit. The synchronization method comprises the following steps of:

(a) generating a plurality of first pseudo noise codes in sequence according to a first code phase sequence and generating a plurality of second pseudo noise codes in sequence according to a second code phase sequence which is the reverse of the first code phase sequence, simultaneously, by the code generating unit;

(b) every time one first pseudo noise code and one second pseudo noise code are generated by the code generating unit, executing a correlation calculation for the first pseudo noise code, the second pseudo noise code and the signal by the correlation unit;

(c) determining a code phase according to the correlation calculations by the determining unit; and (d) synchronizing with the signal according to the code phase by the synchronization unit.

Specifically, certain embodiments of the present invention provide a synchronization device and a synchronization method. With the operations of the code generating unit, the correlation unit, the determining unit and the synchronization unit described above, the synchronization device and the synchronization method search for the code phases in a first order (from the minimum code phase to the maximum code phase) and a second order (from the maximum code phase to the minimum code phase) simultaneously to speed up the acquisition of code phases. Therefore, as compared with the conventional unidirectional code phase searching (which adopts one of the first order and the second order described above), the bidirectional code phase searching of the present invention can increase the speed of searching code phases effectively.

On the other hand, due to the effect of Doppler frequency shift and/or the effect of the oscillation frequency error between the transmitter and the receiver, there will be a code frequency shift between the code frequency of the PN code generated by the receiver and the code frequency of the signal received by the receiver. This causes a code phase difference between the PN code generated by the receiver and the signal received by the receiver to vary with the time. For example, if the code frequency of the PN code generated by the receiver is higher than the code frequency of the signal received by the receiver, then the code phase of the PN code is ahead of the code phase of the signal received. This causes the code phase difference between the PN code and the signal received to decrease gradually with the time. On the other hand, if the code frequency of the PN code generated by the receiver is lower than the code frequency of the signal received by the receiver, then the code phase of the PN code lags behind the code phase of the signal received. This causes the code phase difference between the PN code and the signal received to increase progressively with the time.

Given that the code phase difference between the PN code generated by the receiver and the signal received by the receiver varies with the time, the conventional unidirectional code phase searching may find the correct code phase either faster (when the searching order is in the same direction as the variation of the code phase difference) or slower (when the searching order is in a direction opposite to the variation of the code phase difference). In practice, the direction in which the code phase difference between the PN code generated by the receiver and the signal received by the receiver varies is unknown, so the searching speed of the conventional unidirectional code phase searching is unstable. In contrast, as the bidirectional code phase search is utilized in the present invention, the correct code phase can be found stably and rapidly no matter in what direction the code phase difference between the PN code generated by the receiver and the signal received by the receiver varies with the time.

Accordingly, the synchronization device and the synchronization method provided by certain embodiments of the present invention can perform the code phase searching rapidly and stably in the PN code acquisition stage. In other words, the present invention can perform the code phase searching in the PN code acquisition stage in a more efficient way.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific embodiments, examples, environment, applications or particular implementations described in these embodiments. Therefore, description of these example embodiments is only for purpose of illustration rather than limitation. In the following embodiments and attached drawings, elements unrelated to the present invention are omitted from depiction; and dimensional relationships among the individual elements in the attached drawings are illustrated only for the ease of understanding, but not to limit the actual scale.

Figure 1:
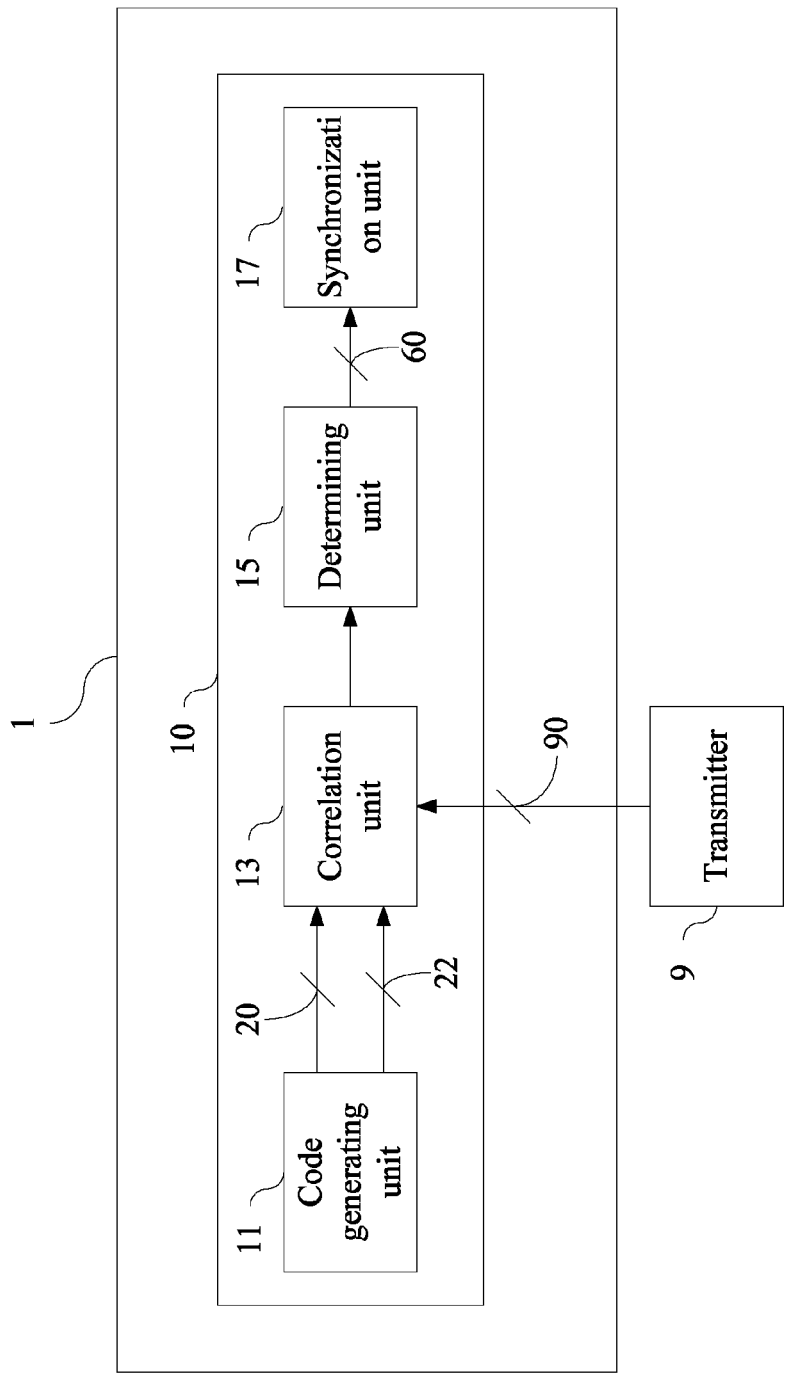
FIG. 1 is schematic structural view of a synchronization device 10 according to a first embodiment of the present invention.

A first embodiment of the present invention is a synchronization device for use in a receiver, a schematic structural view of which is shown in FIG. 1. As shown in FIG. 1, a receiver 1 comprises a synchronization device 10, and the synchronization device 10 comprises a code generating unit 11, a correlation unit 13, a determining unit 15 and a synchronization unit 17. The correlation unit 13 is electrically connected to the code generating unit 11, the determining unit 15 is electrically connected to the correlation unit 13, and the synchronization unit 17 is electrically connected to the determining unit 15.

A transmitter 9 is configured to transmit a signal 90, while the receiver 1 is configured to receive the signal 90. The signal 90 may be any spread spectrum signal of which the PN code spectrum has been spread. The transmitter 9 and the receiver 1 may operate in any spread spectrum communication system, e.g., a wideband code division multiple access (WCDMA) communication system adopting the direct sequence-spread spectrum (DS-SS), a code division multiple access 2000 (CDMA 2000) communication system, or the like.

Figure 2:
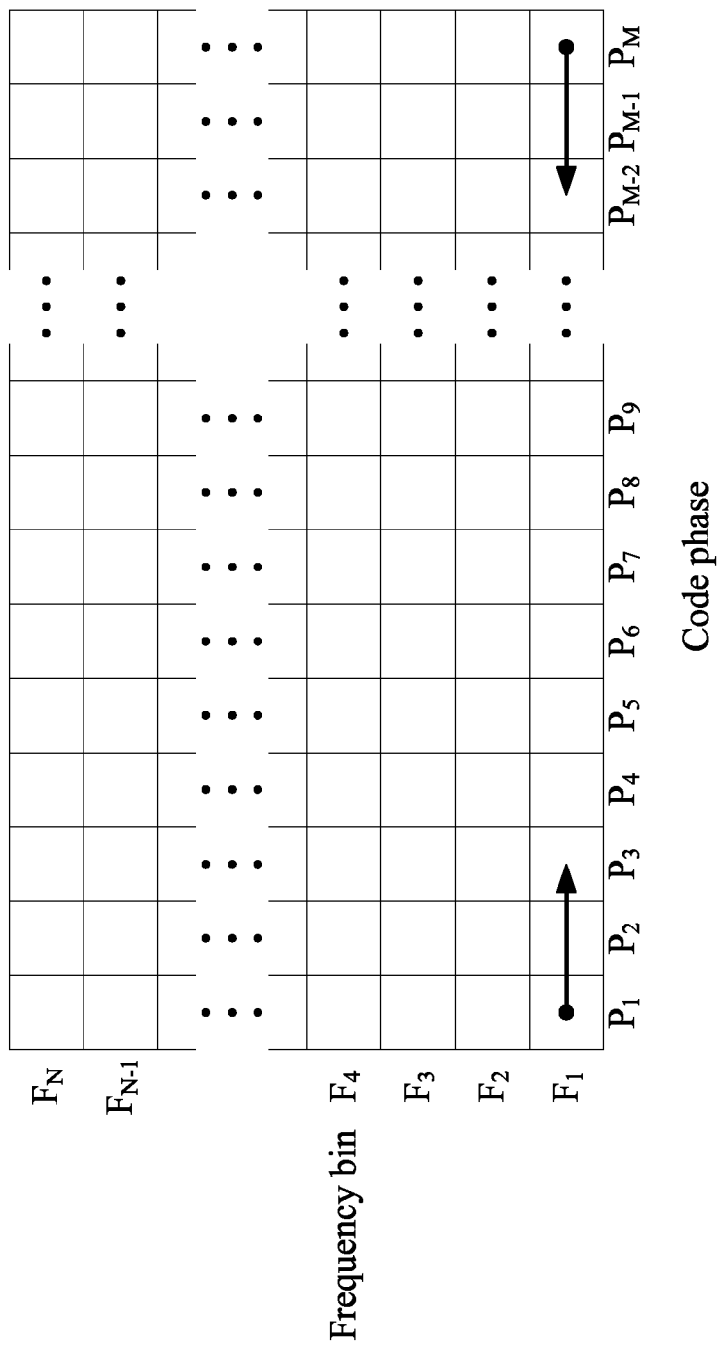
FIG. 2 is a diagram illustrating code phases versus frequency bins corresponding to a PN code generated by the synchronization device 10 according to the first embodiment of the present invention.

FIG. 2 is a diagram illustrating code phases versus frequency bins corresponding to a PN code generated by the synchronization device 10. As shown in FIG. 2, each row represents a plurality of different code phases corresponding to the PN code generated by the synchronization device 10, e.g., code phases $P_1, P_2, P_3, \ldots, P_{M-1}, P_M$ as shown. The number of the code phases is determined by the number of chips in the PN code. Assuming that a PN code has 3 chips, for example, including C1, C2 and C3, then there are 3 code phases corresponding to the PN code, including 'C1, C2, C3', 'C3, C1, C2' and 'C2, C3, C1'.

On the other hand, each column represents a plurality of different code frequencies corresponding to the PN code generated by the synchronization device 10, e.g., code frequencies $F_1, F_2, F_3, \ldots, F_{N-1}, F_N$ as shown. The number of the code frequencies is determined by the frequency shift extent that can be tolerated by the receiver 1. For example, assuming that the signal 90 generated by the transmitter 9 has an oscillation frequency of 500 kHz and the receiver 1 can tolerate a frequency shift extent of 10 kHz, then a code frequency range shown in FIG. 2 is 490 kHz~510 kHz. An interval between code frequencies may vary as required. For example, assuming that the code frequencies have an interval of 2 kHz therebetween, then there are 11 code frequencies within the code frequency range of 490 kHz~510 kHz.

The code generating unit 11 is configured to generate a plurality of first PN codes 20 in sequence according to a first code phase sequence and generate a plurality of second PN codes 22 in sequence according to a second code phase sequence which is the reverse of the first code phase sequence, simultaneously. As shown in FIG. 2, assuming that the first code phase sequence is in the order of $P_1, P_2, P_3, \ldots, P_{M-1}, P_M$, with $P_1$ being the minimum code phase (or having a code phase difference of zero) and $P_M$ being the maximum code phase (or having the maximum code phase difference), then the second code phase sequence is in the order of $P_M, P_{M-1}, \ldots, P_3, P_2, P_1$. In other words, the code generating unit 11 performs code phase searching on a code phase sequence bidirectionally from both ends of the sequence towards each other, and generates one first PN code 20 and one second PN code 22 simultaneously each time.

The correlation unit 13 is configured to, every time one first PN code 20 and one second PN code 22 are generated by the code generating unit 11, execute a correlation calculation for the first PN code 20, the second PN code 22 and the signal 90. The correlation unit 13 may have an active correlation structure or a passive correlation structure. A result obtained from the correlation calculations executed by the correlation unit 13 with the active correlation structure is consistent with that of the correlation unit 13 with the passive correlation structure. The active correlation structure is different from the passive correlation structure only in that: the active correlation structure has a relatively slow calculating speed but a relatively simple structure, while the passive correlation structure has a relatively fast calculating speed but a relatively complex structure. The active correlation structure and the passive correlation structure described above are well known to those of ordinary skill in the art, and thus will not be further described herein. The determining unit 15 is configured to determine a code phase 60 (i.e., a code phase corresponding to the minimum code phase difference) according to the correlation calculations. The synchronization unit 17 is configured to synchronize with the signal 90 (i.e., to achieve synchronization in the code phase acquisition stage) according to the code phase 60.

Figure 3A:
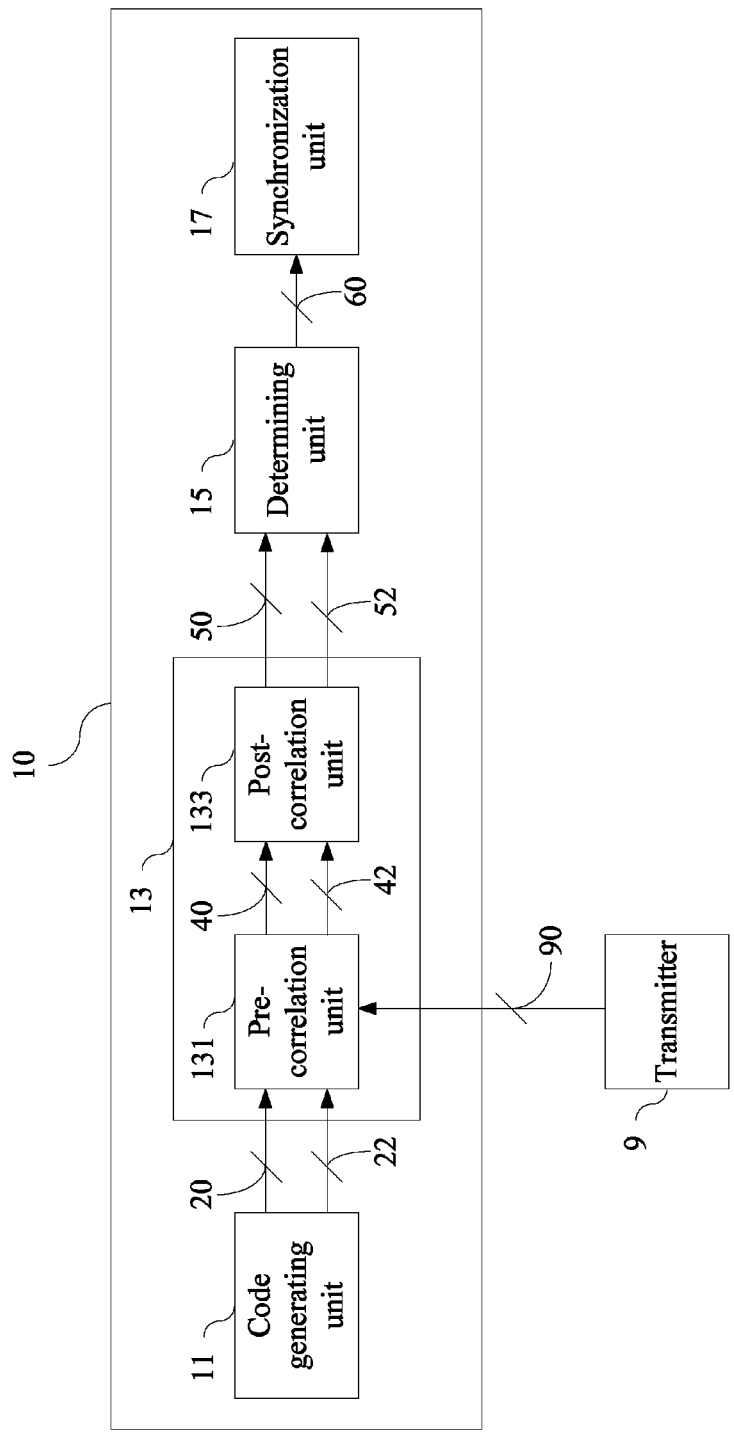
FIG. 3A is a diagram illustrating operations of a correlation unit 13 and a determining unit 15 according to the first embodiment of the present invention.
Figure 3B:
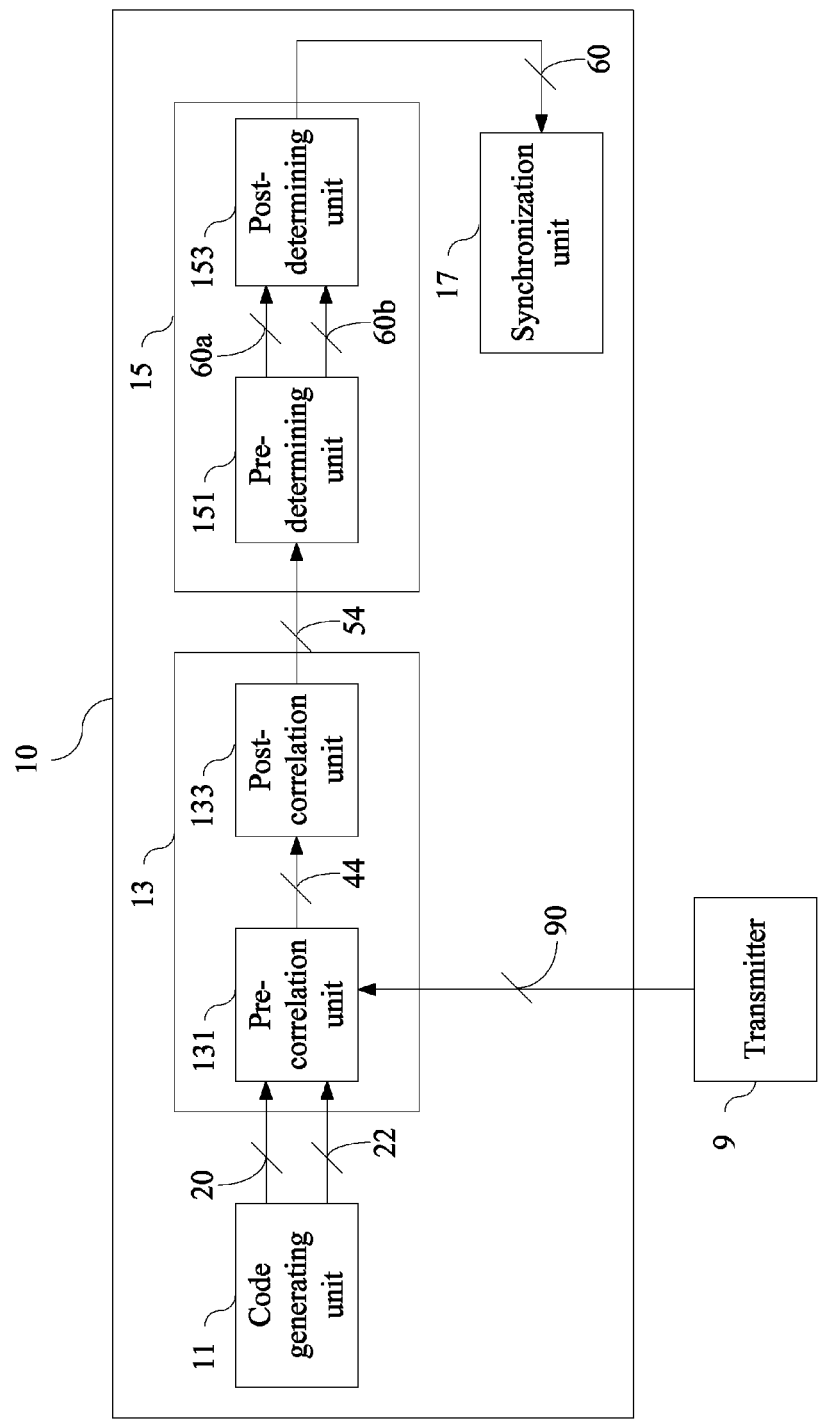
FIG. 3B is another diagram illustrating operations of the correlation unit 13 and the determining unit 15 according to the first embodiment of the present invention.

In the following descriptions, operations of the correlation unit 13 and the determining unit 15 of the synchronization device 10 will be detailed with reference to FIG. 3A and FIG. 3B as two examples respectively. FIG. 3A is a diagram illustrating operations of the correlation unit 13 and the determining unit 15, and FIG. 3B is another diagram illustrating operations of the correlation unit 13 and the determining unit 15.

As shown in FIG. 3A, every time one first PN code 20 and one second PN code 22 are generated by the code generating unit 11, the correlation unit 13 calculates a first correlation value 50 for the first PN code 20 and the signal 90 and calculates a second correlation value 52 for the second PN code 22 and the signal 90 respectively. The correlation unit 13 may have an active correlation structure or a passive correlation structure. The determining unit 15 is configured to determine the code phase 60 according to the first correlation values 50 and the second correlation values 52. Based on the high autocorrelation of the PN codes, the determining unit 15 can find a maximum correlation value by comparing the first correlation values 50 and the second correlation values 52. The code phase of the PN code corresponding to the maximum correlation value is just the code phase 60. Finally, the synchronization unit 17 is configured to synchronize with the signal 90 (i.e., to achieve synchronization in the code phase acquisition stage) according to the code phase 60.

Firstly, an implementation in which the correlation unit 13 comprises only a pre-correlation unit 131 but does not comprise the post-correlation unit 133 will be described. In this implementation, the pre-correlation unit 131 calculates each first correlation value 50 for the first PN code 20 and the signal 90 and calculates each second correlation value 52 for the second PN code 22 and the signal 90 respectively in one step. Specifically, every time one first PN code 20 and one second PN code 22 are generated by the code generating unit 11, the correlation unit 13 calculates a first correlation value 50 for the first PN code 20 and the signal 90 and calculates a second correlation value 52 for the second PN code 22 and the signal 90 respectively.

For example, assume that the first PN code 20 comprises chips C1, C2, C3, C4, C5, C6, C7, C8, C9 and C10 (abbreviated as 'C1~C10' hereinafter), the second PN code 22 comprises chips C10, C1, C2, C3, C4, C5, C6, C7, C8 and C9 (abbreviated as 'C10~C9' hereinafter), and the signal 90 comprises chips D1, D2, D3, D4, D5, D6, D7, D8, D9 and D10 (abbreviated as 'D1~D10' hereinafter). Then the pre-correlation unit 131 calculates the first correlation value 50 for C1~C10 and D1~D10 directly and calculates the second correlation value 52 for C10~C9 and D1~D10 directly.

Next, an implementation in which the correlation unit 13 comprises both the pre-correlation unit 131 and the post-correlation unit 133 will be described. In this implementation, the pre-correlation unit 131 calculates each first correlation value 50 for the first PN code 20 and the signal 90 and calculates each second correlation value 52 for the second PN code 22 and the signal 90 respectively in a stepwise manner. Specifically, every time one first PN code 20 and one second PN code 22 are generated by the code generating unit 11, the pre-correlation unit 131 calculates a first pre-correlation value 40 for each sub-PN code of the first PN code 20 and a corresponding sub-signal of the signal 90, and calculates a second pre-correlation value 42 for each sub-PN code of the second PN code 22 and a corresponding sub-signal of the signal 90. The post-correlation unit 133 calculates the first correlation value 50 according to the first pre-correlation values 40 and calculates the second correlation value 52 according to the second pre-correlation values 42.

For example, assume that the first PN code 20 comprises chips C1~C10, the second PN code 22 comprises chips C10~C9, and the signal 90 comprises D1~D10. Here, take a case in which the calculation is executed in the following two steps as an example. The pre-correlation unit 131 calculates a first pre-correlation value 40 for chips C1~C5 (i.e., a sub-PN code) of the first PN code 20 and chips D1~D5 (i.e., a corresponding sub-signal) of the signal 90 and for chips C6~C10 (i.e., a sub-PN code) of the first PN code 20 and chips D6~D10 (i.e., a corresponding sub-signal) of the signal 90, respectively. Then, the post-correlation unit 133 calculates the first correlation value 50 according to the first pre-correlation values 40. Similarly, the pre-correlation unit 131 calculates a second pre-correlation value 42 for chips C10~C4 (i.e., a sub-PN code) of the second PN code 22 and chips D1~D5 (i.e., a corresponding sub-signal) of the signal 90 and for chips C5~C9 (i.e., a sub-PN code) of the second PN code 22 and chips D6~D10 (i.e., a corresponding sub-signal) of the signal 90 respectively. Then, the post-correlation unit 133 calculates the second correlation value 52 according to the first pre-correlation values 42. The number of steps executed in the stepwise calculation is not intended to limit the present invention and can vary as required.

The post-correlation unit 133 may be any post-correlation detector, examples of which include but are not limited to: a conventional differential combination (CDC) post-correlation detector, a generalized differential combination (GDC) post-correlation detector, a modified generalized differential combination (MGDC) post-correlation detector, or the like. Details of the aforesaid stepwise calculation are well known to those of ordinary skill in the art, and thus will not be further described herein.

As shown in FIG. 3B, every time one first PN code 20 and one second PN code 22 are generated by the code generating unit 11, the correlation unit 13 calculates a third PN code (not shown) according to the first PN code 20 and the second PN code 22 and calculates a correlation value 54 for the third PN code and the signal 90. The correlation unit 13 may have an active correlation structure or a passive correlation structure. The third PN code may be obtained by adding the respective chips comprised in the first PN code 20 to the respective chips comprised in the second PN code 22. For example, assuming that the first PN code 20 comprises chips C1, C2 and C3, the second PN code 22 comprises chips C4, C5 and C6, then the third PN code comprises chips C1+C4, C2+C5 and C3+C6. In other words, the correlation value 54 calculated for the third PN code and the signal 90 by the correlation unit 13 can reflect the correlation between the sum of the two code phases and the signal 90.

In this example, the determining unit 15 may comprise a pre-determining unit 151 and a post-determining unit 153. The pre-determining unit 151 is configured to determine two code phase candidates 60a, 60b according to the correlation values 54. Based on the high autocorrelation of the PN codes, the pre-determining unit 151 can find a maximum correlation value by comparing the correlation values 54 so as to determine the two code phase candidates 60a, 60b of the PN code corresponding to the maximum correlation value.

Through the operations of the pre-determining unit 151, it only can be learned that one of the two code phase candidates 60a, 60b is the code phase corresponding to the minimum code difference, but which one is the code phase corresponding to the minimum code difference cannot be determined yet. Therefore, the post-determining unit 153 is configured to determine the code phase 60 from the two code phase candidates 60a, 60b. Specifically, the post-determining unit 153 can compare the correlation value between the first PN code 20 corresponding to the code phase candidate 60a and the signal 90 with the correlation value between the second PN code 22 corresponding to the code phase candidate 60b and the signal 90, and determine the code phase of the PN code corresponding to the larger correlation value as the code phase 60. Then, the synchronization unit 17 synchronizes with the signal 90 (i.e., to achieve synchronization in the code phase acquisition stage) according to the code phase 60 after the code phase 60 is determined.

Firstly, an implementation in which the correlation unit 13 comprises only the pre-correlation unit 131 but does not comprise the post-correlation unit 133 will be described. In this implementation, the pre-correlation unit 131 calculates each correlation values 54 for the third PN code and the signal 90 in one step. Specifically, every time one first PN code 20 and one second PN code 22 are generated by the code generating unit 11, the pre-correlation unit 131 calculates a third PN code according to the first PN code 20 and the second PN code 22 and calculates a correlation value 54 for the third PN code and the signal 90.

For example, assume that the first PN code 20 comprises chips C1~C10, the second PN code 22 comprises chips C10~C9, and the signal 90 comprises ships D1~D10. Then the pre-correlation unit 131 firstly calculates a third PN code which comprises chips C1+C10, C2+C1, C3+C2, C4+C3, C5+C4, C6+C5, C7+C6, C8+C7, C9+C8 and C10+C9 (abbreviated as 'E1~E10' hereinafter). Then, the pre-correlation unit 131 calculates the correlation value 54 for E1~E10 and D1~D10 directly.

Then, an implementation in which the correlation unit 13 comprises both the pre-correlation unit 131 and the post-correlation unit 133 will be described. In this implementation, the pre-correlation unit 131 calculates each correlation value 54 for the third PN code and the signal 90 in a stepwise manner. Specifically, every time one first PN code 20 and one second PN code 22 are generated by the code generating unit 11, the pre-correlation unit 131 calculates a third PN code according to the first PN code 20 and the second PN code 22 and calculates a pre-correlation value 44 for each sub-PN code of the third PN code and a corresponding sub-signal of the signal 90. Then, the post-correlation unit 133 calculates the correlation value 54 according to the pre-correlation values 44.

For example, assume that the first PN code 20 comprises chips C1~C10, the second PN code 22 comprises chips C10~C9, the third PN code corresponding to the first PN code 20 and the second PN code 22 comprises chips E1~E10, and the signal 90 comprises ships D1~D10. Here, take a case in which the calculation is executed in the following two steps as an example. The pre-correlation unit 131 calculates a pre-correlation value 44 for E1~E5 (i.e., a sub-PN code) and D1~D5 (i.e., a corresponding sub-signal) and for E6~E10 (i.e., a sub-PN code) and D6~D10 (i.e., a corresponding sub-signal) respectively. Then, the post-correlation unit 133 calculates the correlation value 54 according to the pre-correlation values 54. The number of steps executed in the stepwise calculation is not intended to limit the present invention and can vary as required.

The post-correlation unit 133 may be any post-correlation detector, examples of which include but are not limited to: a conventional differential combination (CDC) post-correlation detector, a generalized differential combination (GDC) post-correlation detector, a modified generalized differential combination (MGDC) post-correlation detector, or the like. Details of the aforesaid stepwise calculation are well known to those of ordinary skill in the art, and thus will not be further described herein.

As compared with the determining unit 15 shown in FIG. 3A, the determining unit 15 shown in FIG. 3B needs to make an additional determination according to the two code phase candidates 60a, 60b in order to determine the code phase 60, so the structural complexity thereof is slightly increased. However, as compared with the correlation unit 13 shown in FIG. 3A, the correlation unit 13 shown in FIG. 3B eliminates the need of making calculations for the first PN code 20 and the second PN code 22 separately, so the structural complexity is halved. In contrast, the structural complexity of the synchronization device 10 shown in FIG. 3B is much lower than that of the synchronization device 10 shown in FIG. 3A. As compared with the conventional synchronization device (which adopts the unidirectional code phase searching), the synchronization device 10 shown in FIG. 3B can speed up the code phase searching by only modifying the structure of the determining unit 15 slightly; and the synchronization device 10 shown in FIG. 3A can also speed up the code phase searching by only modifying the structure of the correlation unit 13 appropriately.

A second embodiment of the present invention is a synchronization method for use in a receiver. The receiver is configured to receive a signal from a transmitter. The transmitter and the receiver may operate in a spread spectrum communication system, and the signal is a spread spectrum signal. The receiver of this embodiment comprises a synchronization device. The synchronization device may comprise a code generating unit, a correlation unit, a determining unit and a synchronization unit. Essentially, the receiver, the synchronization device, the code generating unit, the correlation unit, the determining unit and the synchronization unit described in this embodiment may be considered as the receiver 1, the synchronization device 10, the code generating unit 11, the correlation unit 13, the determining unit 15 and the synchronization unit 17 described in the first embodiment. The correlation unit of this embodiment may have an active correlation structure or a passive correlation structure.

Figure 4:
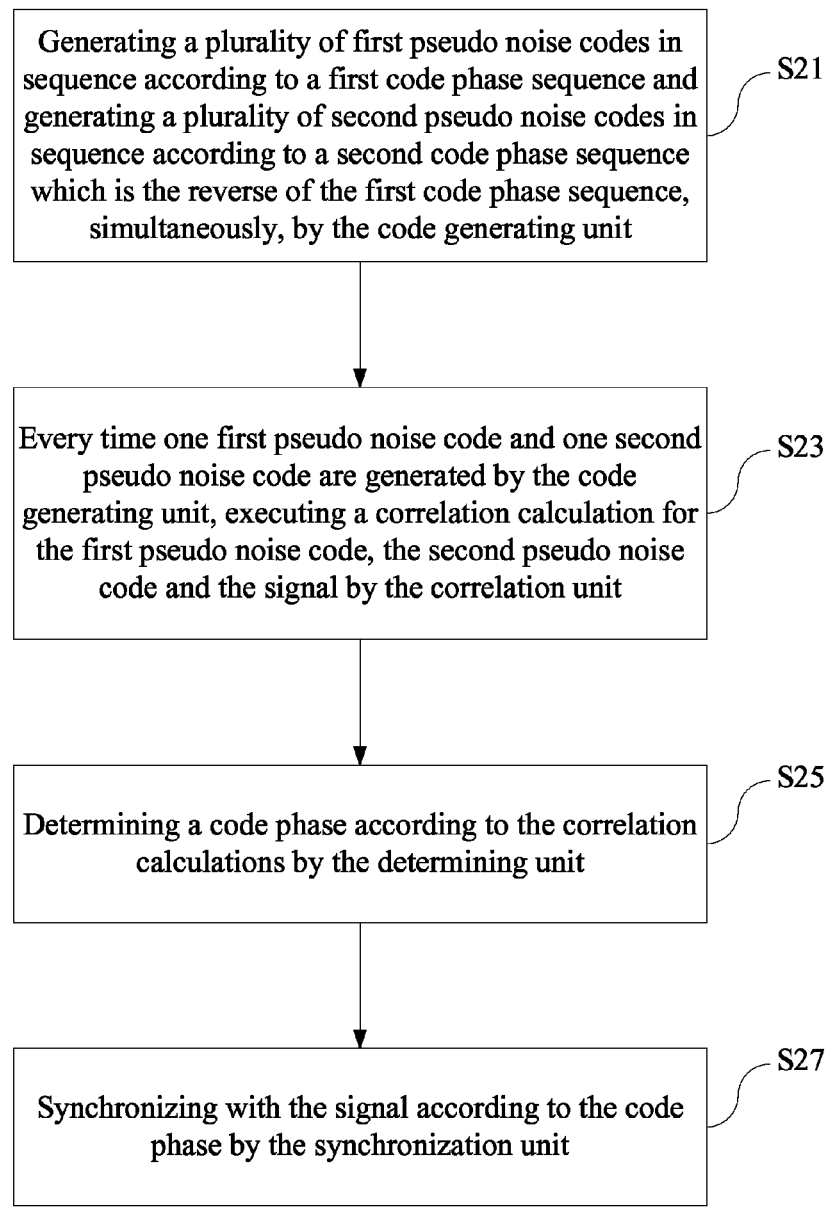
FIG. 4 is a flowchart diagram of a synchronization method according to a second embodiment of the present invention.

FIG. 4 is a flowchart diagram of the synchronization method according to this embodiment. As shown in FIG. 4, the synchronization method comprises steps S21, S23, S25 and S27, but the order of these steps is not intended to limit the present invention. In the step S21, the code generating unit generates a plurality of first pseudo noise codes in sequence according to a first code phase sequence and generates a plurality of second pseudo noise codes in sequence according to a second code phase sequence which is the reverse of the first code phase sequence, simultaneously. In the step S23, every time one first pseudo noise code and one second pseudo noise code are generated by the code generating unit, the correlation unit executes a correlation calculation for the first pseudo noise code, the second pseudo noise code and the signal. In the step S25, the determining unit determines a code phase according to the correlation calculations. In the step S27, the synchronization unit synchronizes with the signal according to the code phase.

In an example of this embodiment, the step S23 may be a step of: every time one first pseudo noise code and one second pseudo noise code are generated by the code generating unit, calculating a first correlation value for the first pseudo noise code and the signal and calculating a second correlation value for the second pseudo noise code and the signal by the correlation unit. Furthermore, the step S25 may be a step of: determining the code phase according to the first correlation values and the second correlation values by the determining unit.

In this example, if the correlation unit further comprises a pre-correlation unit and a post-correlation unit, then the step S23 may be a step of: every time one first pseudo noise code and one second pseudo noise code are generated by the code generating unit, calculating a first pre-correlation value for each sub-pseudo noise code of the first pseudo noise code and a corresponding sub-signal of the signal and calculating a second pre-correlation value for each sub-pseudo noise code of the second pseudo noise code and a corresponding sub-signal of the signal by the pre-correlation unit, and calculating the first correlation value according to the first pre-correlation values and calculating the second correlation value according to the second pre-correlation values by the post-correlation unit.

In an example of this embodiment, the step S23 may be a step of: every time one first pseudo noise code and one second pseudo noise code are generated by the code generating unit, calculating a third pseudo noise code according to the first pseudo noise code and the second pseudo noise code and calculating a correlation value for the third pseudo noise code and the signal by the correlation unit. Furthermore, the step S25 may be a step of: determining the code phase according to the correlation values by the determining unit.

In this example, if the correlation unit further comprises a pre-correlation unit and a post-correlation unit, then the step S23 may be a step of: every time one first pseudo noise code and one second pseudo noise code are generated by the code generating unit, calculating the third pseudo noise code according to the first pseudo noise code and the second pseudo noise and calculating a pre-correlation value for each sub-pseudo noise code of the third pseudo noise code and a corresponding sub-signal of the signal by the pre-correlation unit, and calculating the correlation value according to the pre-correlation values by the post-correlation unit.

In an example of this embodiment, if the determining unit further comprises a pre-determining unit and a post-determining unit, then the step S25 may be a step of: determining two code phase candidates according to the correlation values by the pre-determining unit, and determining the code phase according to the two code phase candidates by the post-determining unit.

In addition to the aforesaid steps, the synchronization method of this embodiment can also execute all the operations and functions set forth in the synchronization device 1 of the first embodiment. Steps undisclosed in this embodiment will be readily appreciated by those of ordinary skill in the art based on the explanation of the first embodiment, and thus will not be further described herein.

According to the above descriptions, the present invention provides a synchronization device and a synchronization method. With the operations of the code generating unit, the correlation unit, the determining unit and the synchronization unit described above, the synchronization device and the synchronization method search for the code phases in a first order (from the minimum code phase to the maximum code phase) and a second order (from the maximum code phase to the minimum code phase) simultaneously to speed up the acquisition of code phases. Therefore, as compared with the conventional unidirectional code phase searching (which adopts one of the first order and the second order described above), the bidirectional code phase searching of the present invention can increase the speed of searching code phases effectively.

On the other hand, due to the effect of Doppler frequency shift and/or the effect of the oscillation frequency error between the transmitter and the receiver, there will be a code frequency shift between the code frequency of the PN code generated by the receiver and the code frequency of the signal received by the receiver. This causes a code phase difference between the PN code generated by the receiver and the signal received by the receiver to vary with the time. For example, if the code frequency of the PN code generated by the receiver is higher than the code frequency of the signal received by the receiver, then the code phase of the PN code is ahead of the code phase of the signal received. This causes the code phase difference between the PN code and the signal received to decrease gradually with the time. On the other hand, if the code frequency of the PN code generated by the receiver is lower than the code frequency of the signal received by the receiver, then the code phase of the PN code lags behind the code phase of the signal received. This causes the code phase difference between the PN code and the signal received to increase progressively with the time.

Given that the code phase difference between the PN code generated by the receiver and the signal received by the receiver varies with the time, the conventional unidirectional code phase searching may find the correct code phase either faster (when the searching order is in the same direction as the variation of the code phase difference) or slower (when the searching order is in a direction opposite to the variation of the code phase difference). In practice, the direction in which the code phase difference between the PN code generated by the receiver and the signal received by the receiver varies is unknown, so the searching speed of the conventional unidirectional code phase searching is unstable. In contrast, as the bidirectional code phase search is utilized in the present invention, the correct code phase can be found stably and rapidly no matter in what direction the code phase difference between the PN code generated by the receiver and the signal received by the receiver varies with the time.

Accordingly, the synchronization device and the synchronization method provided by the present invention can perform the code phase searching rapidly and stably in the PN code acquisition stage. In other words, the present invention can perform the code phase searching in the PN code acquisition stage in a more efficient way.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A synchronization device for use in a receiver, the receiver being configured to receive a signal from a transmitter, and the synchronization device comprising:
a code generating unit, being configured to execute the following operations simultaneously:
generating a plurality of first pseudo noise codes for the signal in sequence according to a first code phase sequence; and
generating a plurality of second pseudo noise codes for the signal in sequence according to a second code phase sequence which is the reverse of the first code phase sequence;
a correlation unit electrically connected to the code generating unit, being configured to, every time one first pseudo noise code and one second pseudo noise code are generated by the code generating unit, execute a correlation calculation for the first pseudo noise code, the second pseudo noise code and the signal;
a determining unit electrically connected to the correlation unit, being configured to determine a code phase according to the correlation calculations; and
a synchronization unit electrically connected to the correlation unit, being configured to synchronize with the signal according to the code phase;
wherein every time one first pseudo noise code and one second pseudo noise code are generated by the code generating unit, the correlation unit calculates a first correlation value for the first pseudo noise code and the signal and calculates a second correlation value for the second pseudo noise code and the signal, and the determining unit determines the code phase according to the first correlation values and the second correlation values; and
wherein the correlation unit further comprises a pre-correlation unit and a post-correlation unit, and every time one first pseudo noise code and one second pseudo noise code are generated by the code generating unit, the pre-correlation unit calculates a first pre-correlation value for each sub-pseudo noise code of the first pseudo noise code and a corresponding sub-signal of the signal, and calculates a second pre-correlation value for each sub-pseudo noise code of the second pseudo noise code and a corresponding sub-signal of the signal, and the post-correlation unit calculates the first correlation value according to the first pre-correlation values and calculates the second correlation value according to the second pre-correlation values.

2. The synchronization device as claimed in claim 1, wherein the transmitter and the receiver operate in a spread spectrum communication system and the signal is a spread spectrum signal.

3. The synchronization device as claimed in claim 1, wherein the correlation unit has one of an active correlation structure and a passive correlation structure.

4. A synchronization device for use in a receiver, the receiver being configured to receive a signal from a transmitter, and the synchronization device comprising:
a code generating unit, being configured to execute the following operations simultaneously:
generating a plurality of first pseudo noise codes for the signal in sequence according to a first code phase sequence; and
generating a plurality of second pseudo noise codes for the signal in sequence according to a second code phase sequence which is the reverse of the first code phase sequence;
a correlation unit electrically connected to the code generating unit, being configured to, every time one first pseudo noise code and one second pseudo noise code are generated by the code generating unit, execute a correlation calculation for the first pseudo noise code, the second pseudo noise code and the signal;
a determining unit electrically connected to the correlation unit, being configured to determine a code phase according to the correlation calculations; and
a synchronization unit electrically connected to the correlation unit, being configured to synchronize with the signal according to the code phase;
wherein every time one first pseudo noise code and one second pseudo noise code are generated by the code generating unit, the correlation unit calculates a third pseudo noise code according to the first pseudo noise code and the second pseudo noise code and calculates a correlation value for the third pseudo noise code and the signal, and the determining unit determines the code phase according to the correlation values; and
wherein the correlation unit further comprises a pre-correlation unit and a post-correlation unit, and every time one first pseudo noise code and one second pseudo noise code are generated by the code generating unit, the pre-correlation unit calculates the third pseudo noise code according to the first pseudo noise code and the second pseudo noise code and calculates a pre-correlation value for each sub-pseudo noise code of the third pseudo noise code and a corresponding sub-signal of the signal, and the post-correlation unit calculates the correlation value according to the pre-correlation values.

5. The synchronization device as claimed in claim 4, wherein the transmitter and the receiver operate in a spread spectrum communication system and the signal is a spread spectrum signal.

6. The synchronization device as claimed in claim 4, wherein the correlation unit has one of an active correlation structure and a passive correlation structure.

7. A synchronization device for use in a receiver, the receiver being configured to receive a signal from a transmitter, and the synchronization device comprising:
a code generating unit, being configured to execute the following operations simultaneously:
generating a plurality of first pseudo noise codes for the signal in sequence according to a first code phase sequence; and
generating a plurality of second pseudo noise codes for the signal in sequence according to a second code phase sequence which is the reverse of the first code phase sequence;
a correlation unit electrically connected to the code generating unit, being configured to, every time one first pseudo noise code and one second pseudo noise code are generated by the code generating unit, execute a correlation calculation for the first pseudo noise code, the second pseudo noise code and the signal;
a determining unit electrically connected to the correlation unit, being configured to determine a code phase according to the correlation calculations; and a synchronization unit electrically connected to the correlation unit, being configured to synchronize with the signal according to the code phase;

wherein every time one first pseudo noise code and one second pseudo noise code are generated by the code generating unit, the correlation unit calculates a third pseudo noise code according to the first pseudo noise code and the second pseudo noise code and calculates a correlation value for the third pseudo noise code and the signal, and the determining unit determines the code phase according to the correlation values; and wherein the determining unit further comprises a pre-determining unit and a post-determining unit, and the pre-determining unit determines two code phase candidates according to the correlation values, and the post-determining unit determines the code phase according to the two code phase candidates.

8. The synchronization device as claimed in claim 7, wherein the transmitter and the receiver operate in a spread spectrum communication system and the signal is a spread spectrum signal.

9. The synchronization device as claimed in claim 7, wherein the correlation unit has one of an active correlation structure and a passive correlation structure.

10. A synchronization method for use in a receiver, the receiver being configured to receive a signal from a transmitter and comprising a synchronization device, and the synchronization device comprising a code generating unit, a correlation unit, a determining unit and a synchronization unit, the synchronization method comprising the following steps of:

(a) generating a plurality of first pseudo noise codes for the signal in sequence according to a first code phase sequence and generating a plurality of second pseudo noise codes for the signal in sequence according to a second code phase sequence which is the reverse of the first code phase sequence, simultaneously, by the code generating unit;

(b) every time one first pseudo noise code and one second pseudo noise code are generated by the code generating unit, executing a correlation calculation for the first pseudo noise code, the second pseudo noise code and the signal by the correlation unit;

(c) determining a code phase according to the correlation calculations by the determining unit; and (d) synchronizing with the signal according to the code phase by the synchronization unit;

wherein the step (b) comprises: every time one first pseudo noise code and one second pseudo noise code are generated by the code generating unit, calculating a first correlation value for the first pseudo noise code and the signal and calculating a second correlation value for the second pseudo noise code and the signal by the correlation unit, and the step (c) comprises: determining the code phase according to the first correlation values and the second correlation values by the determining unit; and wherein the step (b) further comprises:

every time one first pseudo noise code and one second pseudo noise code are generated by the code generating unit, calculating a first pre-correlation value for each sub-pseudo noise code of the first pseudo noise code and a corresponding sub-signal of the signal and calculating a second pre-correlation value for each sub-pseudo noise code of the second pseudo noise code and a corresponding sub-signal of the signal by the pre-correlation unit, and calculating the first correlation value according to the first pre-correlation values and calculating the second correlation value according to the second pre-correlation values by the post-correlation unit.

11. The synchronization method as claimed in claim 10, wherein the transmitter and the receiver operate in a spread spectrum communication system and the signal is a spread spectrum signal.

12. The synchronization method as claimed in claim 10, wherein the correlation unit has one of an active correlation structure and a passive correlation structure.

13. A synchronization method for use in a receiver, the receiver being configured to receive a signal from a transmitter and comprising a synchronization device, and the synchronization device comprising a code generating unit, a correlation unit, a determining unit and a synchronization unit, the synchronization method comprising the following steps of:

(a) generating a plurality of first pseudo noise codes for the signal in sequence according to a first code phase sequence and generating a plurality of second pseudo noise codes for the signal in sequence according to a second code phase sequence which is the reverse of the first code phase sequence, simultaneously, by the code generating unit;

(b) every time one first pseudo noise code and one second pseudo noise code are generated by the code generating unit, executing a correlation calculation for the first pseudo noise code, the second pseudo noise code and the signal by the correlation unit;

(c) determining a code phase according to the correlation calculations by the determining unit; and (d) synchronizing with the signal according to the code phase by the synchronization unit;

wherein the step (b) comprises: every time one first pseudo noise code and one second pseudo noise code are generated by the code generating unit, calculating a third pseudo noise code according to the first pseudo noise code and the second pseudo noise code and calculating a correlation value for the third pseudo noise code and the signal by the correlation unit, and the step (c) comprises: determining the code phase according to the correlation values by the determining unit; and wherein the correlation unit further comprises a pre-correlation unit and a post-correlation unit, and the step (b) further comprises:

every time one first pseudo noise code and one second pseudo noise code are generated by the code generating unit, calculating the third pseudo noise code according to the first pseudo noise code and the second pseudo noise and calculating a pre-correlation value for each sub-pseudo noise code of the third pseudo noise code and a corresponding sub-signal of the signal by the pre-correlation unit, and calculating the correlation value according to the pre-correlation values by the post-correlation unit.

14. The synchronization method as claimed in claim 13, wherein the transmitter and the receiver operate in a spread spectrum communication system and the signal is a spread spectrum signal.

15. The synchronization method as claimed in claim 13, wherein the correlation unit has one of an active correlation structure and a passive correlation structure.

16. A synchronization method for use in a receiver, the receiver being configured to receive a signal from a transmitter and comprising a synchronization device, and the synchronization device comprising a code generating unit, a correlation unit, a determining unit and a synchronization unit, the synchronization method comprising the following steps of:
- (a) generating a plurality of first pseudo noise codes for the signal in sequence according to a first code phase sequence and generating a plurality of second pseudo noise codes for the signal in sequence according to a second code phase sequence which is the reverse of the first code phase sequence, simultaneously, by the code generating unit;
- (b) every time one first pseudo noise code and one second pseudo noise code are generated by the code generating unit, executing a correlation calculation for the first pseudo noise code, the second pseudo noise code and the signal by the correlation unit;
- (c) determining a code phase according to the correlation calculations by the determining unit; and
- (d) synchronizing with the signal according to the code phase by the synchronization unit;

wherein the step (b) comprises: every time one first pseudo noise code and one second pseudo noise code are generated by the code generating unit, calculating a third pseudo noise code according to the first pseudo noise code and the second pseudo noise code and calculating a correlation value for the third pseudo noise code and the signal by the correlation unit, and the step (c) comprises: determining the code phase according to the correlation values by the determining unit; and wherein the step (c) further comprises:
determining two code phase candidates according to the correlation values by the pre-determining unit, and determining the code phase according to the two code phase candidates by the post-determining unit.

17. The synchronization method as claimed in claim 16, wherein the transmitter and the receiver operate in a spread spectrum communication system and the signal is a spread spectrum signal.

18. The synchronization method as claimed in claim 16, wherein the correlation unit has one of an active correlation structure and a passive correlation structure.

* * * * *